(12) United States Patent
Curtsinger et al.

(10) Patent No.: US 10,525,391 B1
(45) Date of Patent: Jan. 7, 2020

(54) OIL COALESCING DEVICE

(71) Applicant: DES-CASE CORPORATION, Goodlettsville, TN (US)

(72) Inventors: Cody Curtsinger, Nashville, TN (US); Houston Hatchett, Nashville, TN (US)

(73) Assignee: Des-Case Corporation, Goodlettsville, TN (US)

( * ) Notice: Subject to any disclaimer, the term of this patent is extended or adjusted under 35 U.S.C. 154(b) by 0 days.

(21) Appl. No.: 15/351,226

(22) Filed: Nov. 14, 2016

Related U.S. Application Data

(63) Continuation of application No. 14/297,799, filed on Jun. 6, 2014, now Pat. No. 9,492,772, which is a continuation of application No. 13/220,675, filed on Aug. 29, 2011, now Pat. No. 8,753,436.

(60) Provisional application No. 61/502,312, filed on Jun. 28, 2011, provisional application No. 61/377,500, filed on Aug. 27, 2010.

(51) Int. Cl.
*B01D 53/00* (2006.01)
*B01D 53/26* (2006.01)
*B01D 46/00* (2006.01)
*B01D 53/04* (2006.01)

(52) U.S. Cl.
CPC ......... *B01D 46/001* (2013.01); *B01D 46/003* (2013.01); *B01D 46/0023* (2013.01); *B01D 53/0415* (2013.01); *B01D 53/26* (2013.01); *B01D 2279/35* (2013.01)

(58) Field of Classification Search
CPC  B01D 46/001; B01D 46/0023; B01D 46/003; B01D 53/0415; B01D 53/26; B01D 2279/35
USPC .... 96/134, 136, 139, 152; 55/315, 318, 320, 55/321, 325, 385.4, 485, 489, DIG. 17, 55/DIG. 19
See application file for complete search history.

(56) References Cited

U.S. PATENT DOCUMENTS

| | | | | |
|---|---|---|---|---|
| 3,208,131 | A * | 9/1965 | Ruff | B01J 15/005 228/144 |
| 4,848,989 | A * | 7/1989 | Maeda | B01D 46/0012 55/319 |
| 4,925,466 | A * | 5/1990 | Overby | B01D 46/0004 55/319 |
| 5,030,262 | A * | 7/1991 | Overby | B01D 5/009 137/205 |
| 7,118,614 | B2 * | 10/2006 | Welin | B01D 53/0415 96/132 |
| 8,753,436 | B1 * | 6/2014 | Curtsinger | B01D 46/001 55/318 |
| 9,492,772 | B1 * | 11/2016 | Curtsinger | B01D 46/001 |
| 2007/0107396 | A1 * | 5/2007 | Zuberi | B01D 39/2086 55/523 |

* cited by examiner

*Primary Examiner* — Frank M Lawrence, Jr.
(74) *Attorney, Agent, or Firm* — Patterson Intellectual Property Law, P.C.; Ryan D. Levy; Grant M. Ford

(57) ABSTRACT

An external oil coalescing apparatus for receiving an air flow containing oil; a honeycomb material for coalescing oil contained in the air flow; a first end for receiving the air flow containing oil; and a second for emitting air from the apparatus.

17 Claims, 16 Drawing Sheets

OIL COALESCING DEVICE

CROSS-REFERENCES TO RELATED APPLICATIONS

The present application is a continuation of and claims priority to U.S. patent application Ser. No. 14/297,799 filed Jun. 6, 2014 entitled "Oil Coalescing Device," which claims priority to U.S. patent application Ser. No. 13/220,675 filed Aug. 29, 2011 entitled "Oil Coalescing Device," which claims priority to U.S. Patent Application Ser. No. 61/377,500 filed on Aug. 27, 2010 entitled "Reservoir Breather" and U.S. Patent Application Ser. No. 61/502,312 filed on Jun. 28, 2011 and entitled "Oil Mist Adapter."

BACKGROUND

Technical Field

The present invention relates to an oil coalescing device which may be used to maintain oil while allowing for the flow of air. In optional embodiments, aspects of the invention may include an adapter for use with a desiccant breather so as to better maintain oil within machinery and out of the air. In additional optional embodiments, aspects of the invention may include a desiccant breather that coalesces oil so as to also maintain a greater amount of oil within the machinery.

Background Art

Breathers are often used within industrial machinery or chemicals in allowing air exchange while usually controlling moisture and particulate adsorption. Generally, breathers are used with an included desiccant so as to preclude moisture from accumulating within the machinery or the reservoir to which the breather is attached.

In configuring breathers to function most optimally for a specific function, different breathers may be disposable or possibly serviceable where they can be restored without disposal. Some industrial designs require breathers of a significantly durable condition as the machinery or processes can place mechanical stress upon the breathers.

Various designs of breathers are used in today's industry, some of which may include a desiccant. Many systems include desiccant breathers as moisture can be problematic, especially with hydraulic systems.

Additionally, in dealing with the various materials that are often created or used in industrial processes, controlling airborne particulate matter is often also a function of breathers. Both particulate matter as well as moisture can be destructive for hydraulic systems. Some breathers may also include filters specific to the particulate matter and thus for example can filter solid particulate contaminates at either a two or four micron level. In many instances, the industrial breathers may include both a filter for removing particulate matter as well as a desiccant for trapping moisture, thus providing a dual removal system.

Desiccant breathers may include a hygroscopic material, which may attract and retain water. In some breathers, silica gel may be used as it may attract a significant portion of its weight in water. Such designs may also include other media with the silica so as to prevent moisture and particulates from escape.

Additionally, the industry may also use additives to the desiccant breather such as carbon media to capture oil mist. As the carbon material can adhere the oil, being a hydrocarbon, oil mist exiting the system may be lessened.

Unless some feature or design is used to capture oil mist, problems could result with both the machinery and the work environment. Without capturing the oil mist, pollution within the work environment could be increased. Furthermore, oil mist, upon contacting surfaces can create a slick environment, resulting in conditions that could prove hazardous within the workplace.

Further problems may result where oil accumulates within the desiccant, resulting in the lessened capacity of the desiccant. Additionally, breathers may not allow sufficient airflow for optimum performance in instances where the oil has thoroughly contacted and layered on the various desiccants and/or filters within the breather.

BRIEF SUMMARY

An optional object of the present invention is to provide an external oil coalescing adapter for use with a breather as well as hydraulic equipment. Optionally, the adapter may provide a user with an improve device for trapping oil mist and consolidating the oil mist and returning it to the system. Furthermore, the device may provide a user with an oil coalescing media for coalescing the oil in substantially precluding oil mist from exiting the adapter.

Another optional object of the invention is to provide a breather that includes features that may substantially preclude oil mist from exiting the breather. Optionally, the invention may provide a breather containing internal media for coalescing oil. Further optionally, an optional object may be to include an internal labyrinth within a breather to coalesce oil and substantially preclude the oil from exiting the breather.

An optional aspect includes an external oil coalescing adapter fitted to a desiccant breather with an adapter housing with a coalescing chamber for receiving an air flow containing oil; oil coalescing media contained within the coalescing chamber for coalescing oil contained in the air flow; a first end cap for attaching to one end of the housing, the first end cap also attachable to a breather; and a second end cap for attaching to the opposite end of the housing from the first end cap, the second end cap attachable to a system.

Further optional aspects include honeycomb material as the coalescing media. Additionally, the honeycomb media may be structured as layers of honeycomb material. Further optional embodiments may include the layers of honeycomb material as offset layers of honeycomb media. The honeycomb material may optionally be formed from material chosen from plastics, polymers, metals, fibrous materials, ceramics, and combinations thereof.

In yet further optional aspects, the coalescing media may be foam material. Various optional embodiments include foam which may be formed from material chosen from plastics, polymers, metals, ceramics, and combinations thereof.

Additional optional aspects of the invention may include an external oil coalescing adapter fitted to a desiccate breather with an adapter housing with a coalescing chamber for receiving an air flow containing oil; a labyrinth within the coalescing chamber for diverting airflow and coalescing oil contained in the air flow; a first end cap for attaching to one end of the housing, the first end cap also attachable to a breather; and a second end cap for attaching to the opposite end of the housing from the first end cap, the second end cap attachable to a system.

Further optional aspects may include an external oil coalescing adapter fitted to a desiccate breather with an adapter housing with a coalescing chamber for receiving an air flow containing oil; a labyrinth within the coalescing chamber for diverting airflow and coalescing oil contained in the air flow; a first end cap for attaching to one end of the housing, the first end cap also attachable to a breather; and a second end cap for attaching to the opposite end of the housing from the first end cap, the second end cap attachable to a system with coalescing media. Optionally, the coalescing media may be either honeycomb material or foam material.

Yet further optional aspects of the invention may include an oil coalescing breather comprising a breather housing with a standpipe for receiving an air flow containing oil; oil coalescing media contained within the standpipe for coalescing oil contained in the air flow; an airflow exit for allowing the air flow to exit the breather; and an attachable end for attaching the breather.

Optionally, the oil coalescing breather may include coalescing media that can be honeycomb material. The honeycomb material can be layers of honeycomb material, the layers optionally being offset.

In additional optional aspects the oil coalescing breather may include coalescing media that can be foam material.

Optional aspects may further include an oil coalescing breather with a breather housing with a standpipe for receiving an air flow containing oil; a labyrinth contained within the standpipe for coalescing oil contained in the air flow; an airflow exit for allowing the air flow to exit the breather; and an attachable end for attaching the breather. The optional embodiment of the breather may also include the labyrinth with a reduced cross sectional airflow entrance for increasing the velocity of the airflow; a labyrinth cap with a labyrinth standpipe within the labyrinth cap. Optionally, the breather may include a coalescing media which may comprise honeycomb material and/or foam material.

In accordance with the purpose of the invention, as embodied and broadly described herein, the invention includes a device for coalescing oil. The device may alternatively be an external adapter or a breather, both of which may function to substantially preclude oil mist from exiting the system to which the device is attached. The adapter or breather of the present invention may include a coalescing media for coalescing oil mist or alternatively include a labyrinth to substantially preclude oil from exiting the breather device.

Aside from the structural and procedural arrangements set forth above, the invention could include a number of other arrangements, such as those explained hereinafter. It is to be understood, that both the foregoing description and the following description are exemplary.

The accompanying drawings are incorporated in and constitute a part of this specification. The drawings illustrate optional embodiments of the invention and together with the description serve to explain some principles of the invention.

BRIEF DESCRIPTION OF THE DRAWINGS

Reference will now be made in detail to optional embodiments of the invention, examples of which are illustrated in accompanying drawings. Whenever possible, the same reference numbers are used in the drawing and in the description referring to the same or like parts.

DETAILED DESCRIPTION

Figure 1A:
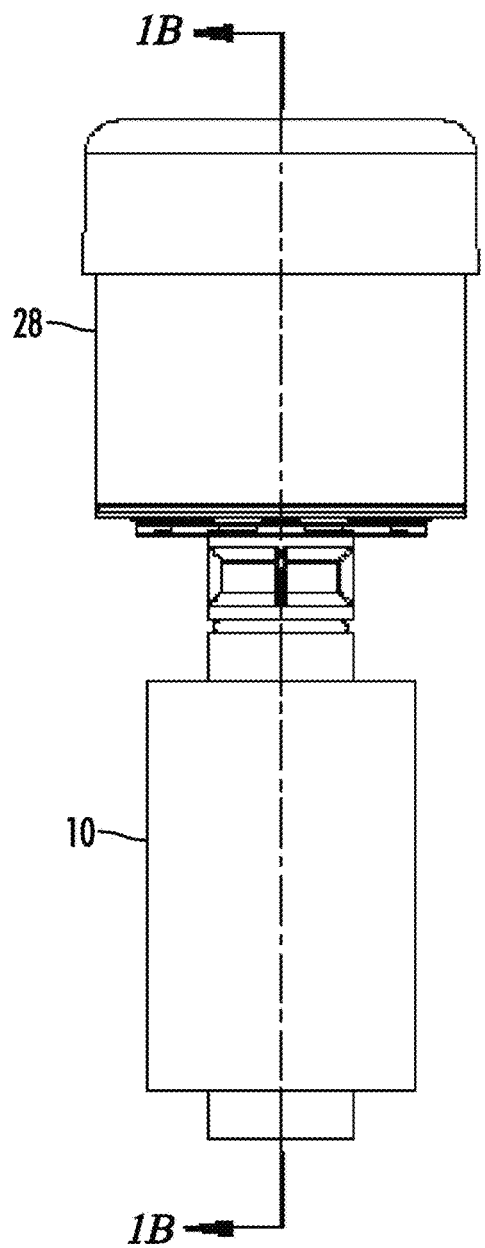
FIGS. 1a and 1b are illustrations of an external oil coalescing adapter including honeycomb material.
Figure 1B:
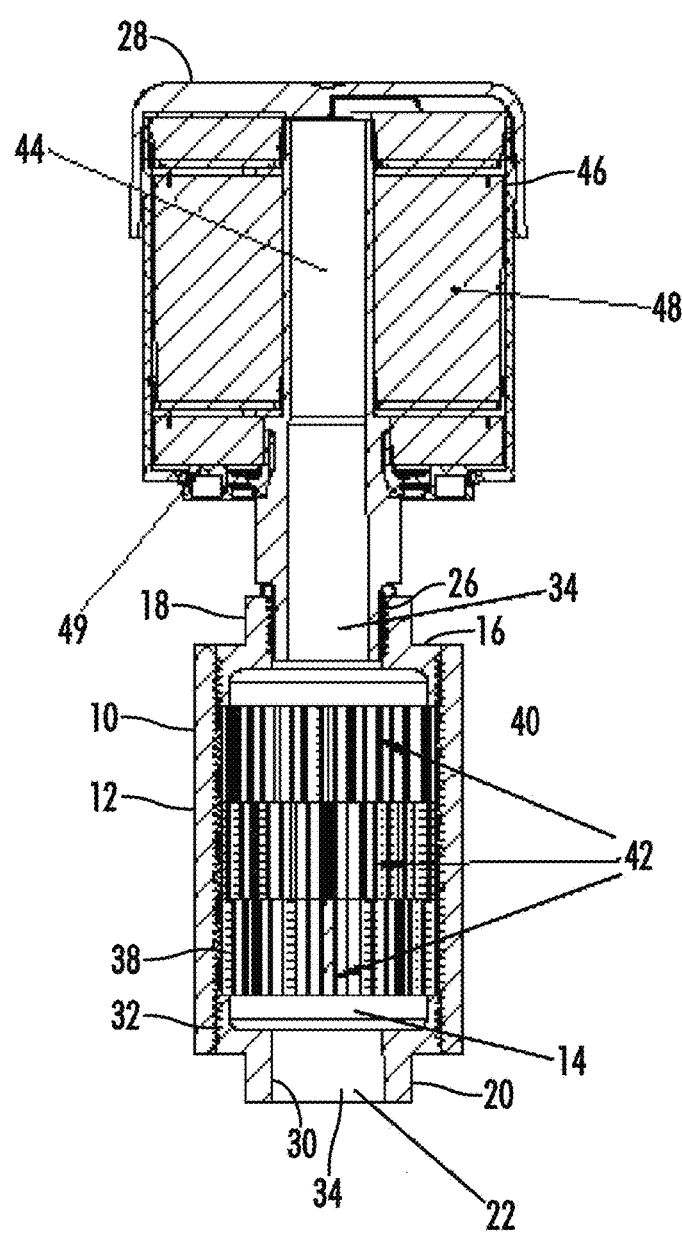
Figure 2:
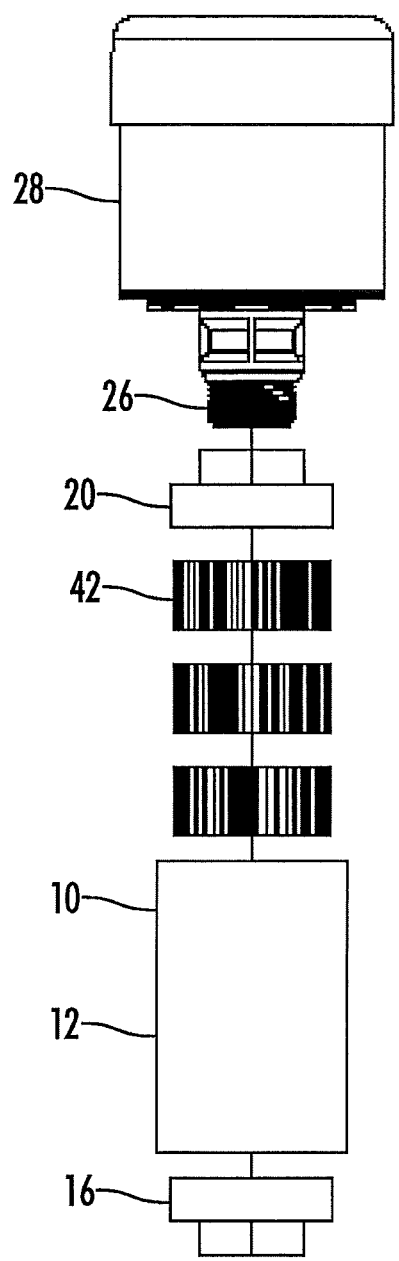
FIG. 2 is an illustration of an exploded view of an external oil coalescing adapter including honeycomb material.
Figure 3:
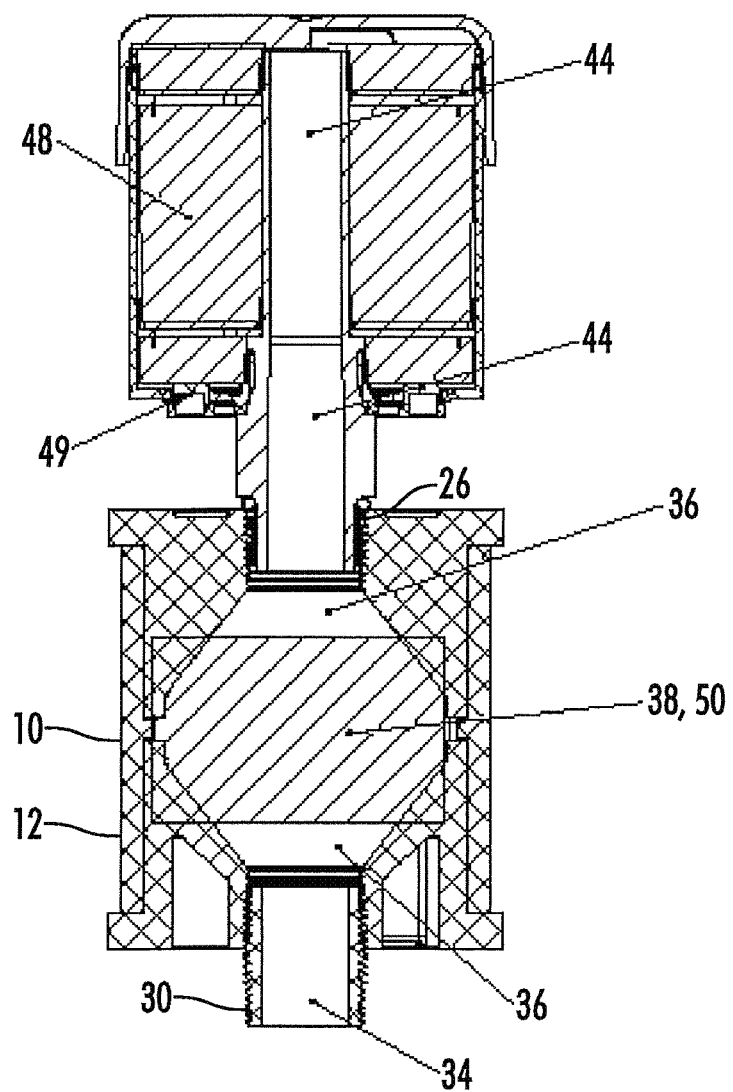
FIG. 3 is an illustration of an external oil coalescing adapter including foam material.
Figure 4:
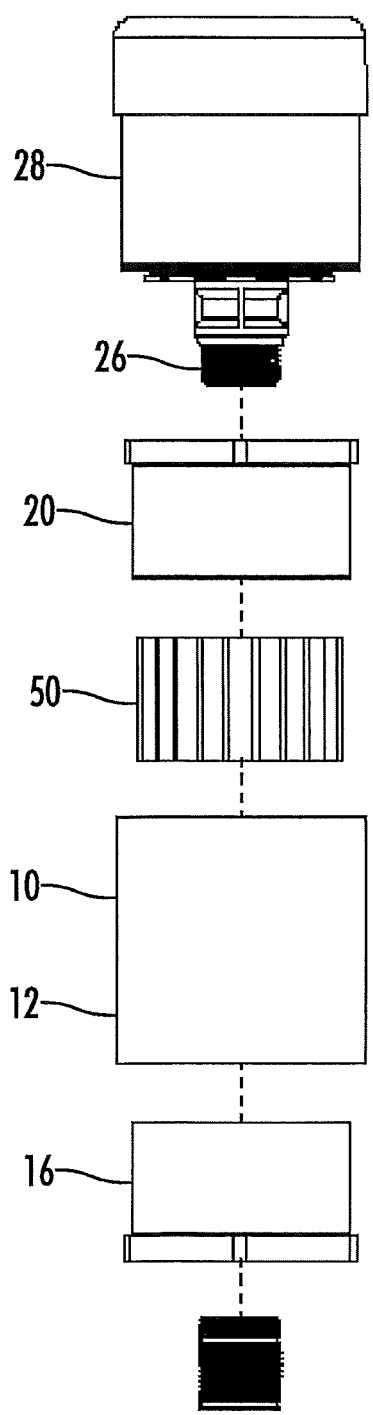
FIG. 4 is an illustration of an exploded view of an external oil coalescing adapter including foam material.
Figure 5:
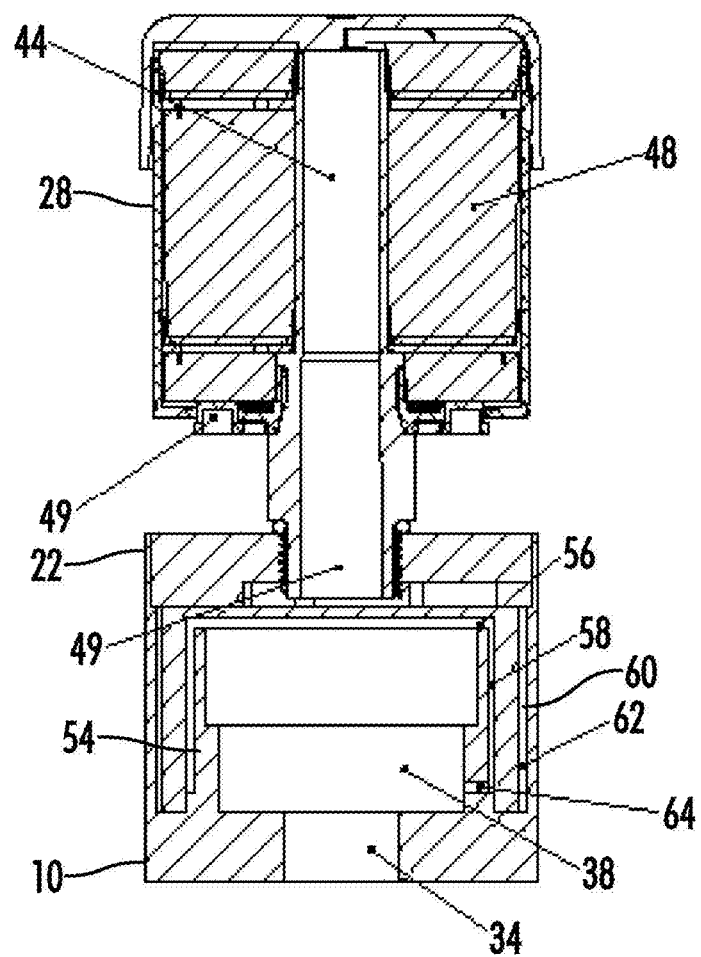
FIG. 5a is an illustration of an external oil coalescing adapter including a labyrinth.
Figure 6:
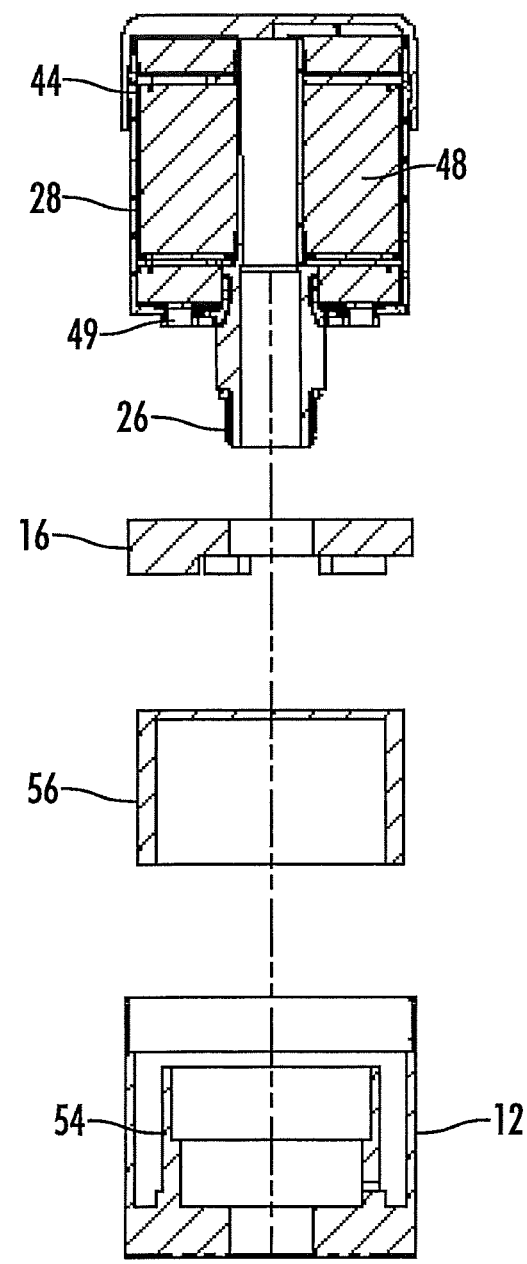
FIG. 6 is an illustration of an exploded view of an external oil coalescing adapter including a labyrinth.
Figure 7:
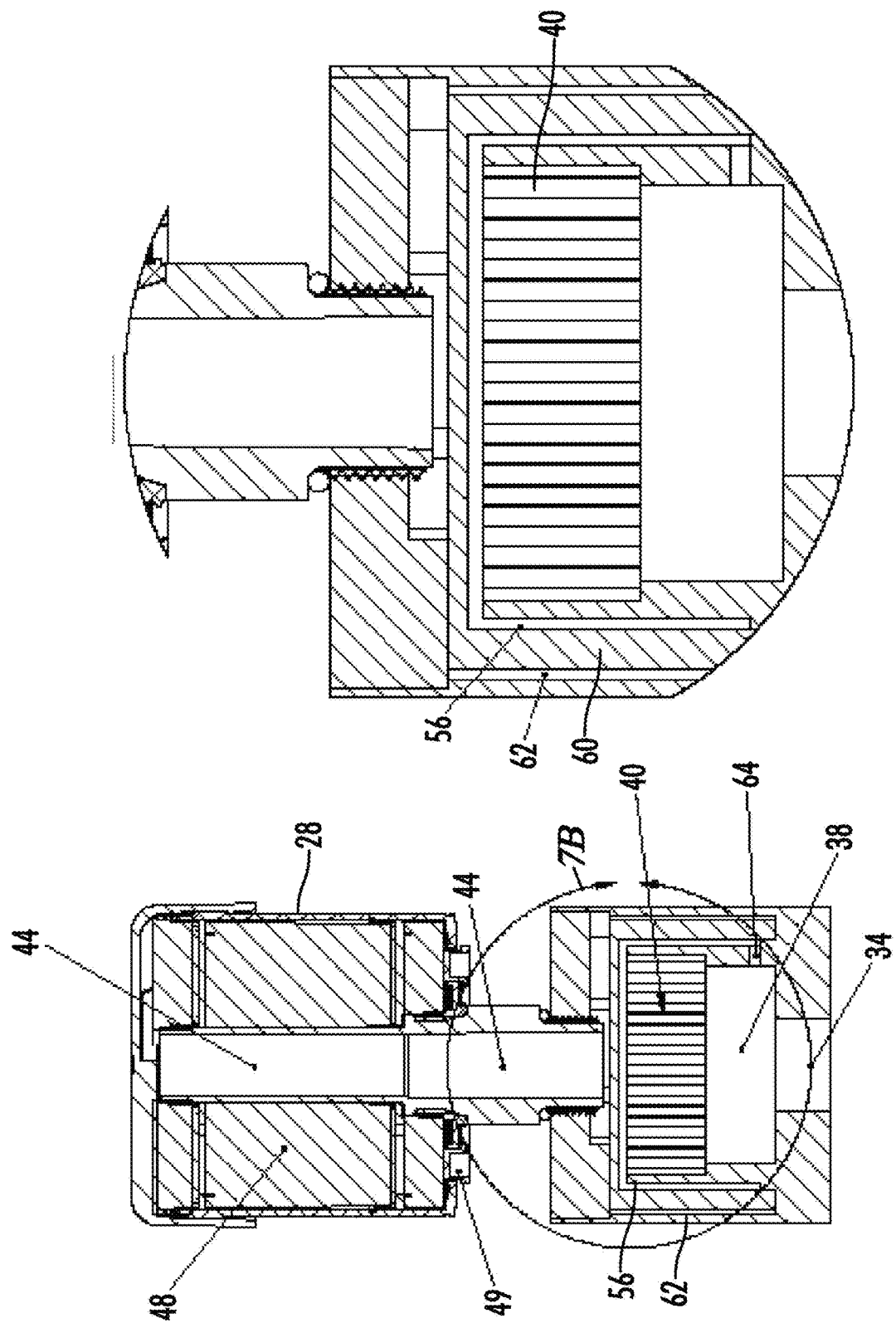
FIGS. 7a and 7b are illustrations of an external oil coalescing adapter including honeycomb material and a labyrinth.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct physical connection between the connected items or an indirect connection through one or more passive or active intermediary devices.

The term "providing", and forms thereof, are used in a broad sense, and are referred to, but are not limited to, making available for use, enabling usage, giving, supplying, obtaining, getting hold of, acquiring, making ready for use, and/or placing into position ready for use.

Referring now to FIGS. 1a-8 there are optional embodiments of the external adapter of the present invention. Generally speaking, external adapter 10 includes adapter housing 12 with coalescing chamber 38 for receiving an air flow containing oil. External adapter 10 may also include first end cap 16 with breather attachment 18 and second end cap 20 with system attachment 22.

External adapter 10 may optionally include an adapter housing 12 formed of various materials, some of which include polymers, metals, plastics, ceramics and combinations thereof. Generally, when viewed from above, optional embodiments of adapter housing 12 can be described as circular or somewhat cylindrical, though in further optional embodiments that shape may be altered.

First end cap 16 may include in optional embodiments, first end cap threads 24 for engaging and connecting with adapter housing 12. In yet further optional embodiments, first end cap 16 may be permanently affixed to adapter housing 12. As used herein "permanently affixed" refers to a condition where the first end cap 16 was not intended to be removed from adapter housing 12. In other optional embodiments, first end cap 16 may be removably attachable to adapter housing 12. Some embodiments may include other attachment styles other than threads, and can include pressure fits and the like.

Additionally, first end cap 16 may include breather attachment 18. As used herein, breather attachment 18 refers to any structure of the external adapter that may join or connect with a breather. Breather attachment 18 may further include breather threads 26 for screwing to breather 28. In yet further optional embodiments, external adapter may use a variety of removably attachable styles to attach to breather 28, including pressure fittings, and the like. Additionally, in yet further optional embodiments, external adapter 10 may be permanently affixed to breather 28.

In yet further optional embodiments an o-ring (not illustrated) may be used in joining external adapter 10 with breather 28. This may help to maintain a seal in flowing air from external adapter 10 to breather 28. Generally in optional embodiments, the o-ring will sit between the junction of external adapter 10 and breather 28 and be under compression.

Second end cap 20 many include end cap threads 32 for attaching second end cap to adapter housing 12. In yet further optional embodiments, second end cap 20 may be permanently affixed to adapter housing 12. In other optional embodiments, second end cap 20 may be removably attachable to adapter housing 12. Some embodiments may include other attachment styles other than threads, and can include pressure fits and the like.

Additionally, second end cap 20 may also include system threads 30 on system attachment 22 and can be attached in a sealing engagement to a system. Most often this attachment is removable so a use can replace external adapter 10 or breather 28 without significant overhaul to the system. In yet further optional embodiments, the system attachment 22 of second end cap 20 may have threads to NPT standards to allow external adapter 10 to be sealed when installed on a reservoir using an NPT hydraulic type fitting.

All embodiments of external adapters 10 include airflow entrance 34. Airflow entrance 34 is generally in communication with the system with which external adapter is connected and allows for the flow of air from the system into external adapter 10. Otherwise stated, air flows into external adapter 10 through airflow entrance 34.

External adapter 10 also includes coalescing chamber 36 where oil contained within the airflow may coalesce against surfaces within external adapter 10. In optional embodiments, coalescing chamber 36 may allow the airflow to spread and flow relatively evenly through coalescing chamber 36. In other optional embodiments the cross-sectional area of coalescing chamber may be greater or smaller than that of the cross-sectional area of airflow entrance 34.

In optional embodiments of the external adapter 10, coalescing chamber 36 may include coalescing media 38. Coalescing media 38 assists in the coalescing of oil from the airflow within coalescing chamber 36. In optional embodiments, coalescing media 38 provides for an increased surface area so that the oil has greater surfaces upon which to coalesce.

In optional embodiments of the external adapter 10, the coalescing media may be honeycomb material 40. As used herein, honeycomb material 40 is understood to have series of openings which may resemble that of a natural honeycomb. Generally, honeycomb material 40 provides a multitude of different surfaces upon which oil may coalesce while still providing sufficient space to allow for airflow through external adapter 10. In yet further optional embodiments, one long continuous piece of honeycomb material 40 may be provided.

Alternatively and in optional embodiments, honeycomb material 40 may be in honeycomb layers 42. In such optional arrangements, honeycomb layers 42 may be slightly offset, and thus may force air to divert along different surfaces of the next layer. In such an arrangement with offset honeycomb layers 42, coalescing of oil may be increased as the air must flow and contact additional walls which may influence increased coalescing.

Honeycomb material 40 may have a variety of different sized openings and be formed of a variety of different material for use in external adapter 10. Generally, honeycomb material 40 may be formed of a plastic or a polymer but can additionally be formed from fibrous materials, metals, ceramics and combinations thereof.

In understanding how an optional embodiment of external adapter 10 containing honeycomb material 40 in honeycomb layers 32, air containing oil mist first may flow from a reservoir into airflow entrance 34 of external adapter 10. The air may then enter coalescing chamber 36 which may optionally allow the air to spread out and flow relatively evenly through coalescing media 38, which in this optional embodiment includes offset honeycomb layers 42. As such, the air flows through the multiple layers of honeycomb material 42. While the air passes through honeycomb layers 42, surface friction between the moving air and the internal surfaces of honeycomb material 40 may cause oil droplets to coalesce along the walls of honeycomb material 40. As honeycomb material 40 is optionally in offset layers of honeycomb 42, such orientation may force the air that didn't flow along a surface of a honeycomb layer 42 to flow along the surface of the next layer of honeycomb 42.

After adapter 10, and after traveling through multiple layers of honeycomb 42, the air may continue into standpipe 44 of breather 28. As the air flows through standpipe 44, oil may optionally coalesce along the inner surface of the standpipe 44. The substantially oil mist free air may then exit breather standpipe 44 and flow through particulate filters 46 and desiccant bed 48 and finally out through breather exit 49. The oil that is coalesced along the walls of honeycomb material 40 and standpipe 44 may form droplets big enough to fall back into the reservoir under the influence of gravity. Otherwise stated, the coalesced oil may fall back into the reservoir under no external forces other than gravity, but as the reservoir inhales fresh air from the atmosphere, the incoming air may assist in purging the coalesced oil from external adapter 10 and breather 28.

In yet further optional embodiments of external adapter 10, coalescing media 38 may be foam material 50. Generally, the foam may be an open-cell foam so as to allow airflow there through foam material 50. Foam material 50 may function similarly to honeycomb material 40 though generally is thought to have a different distribution of openings and most often is the result of a chemical reaction, as opposed to being molded. In such optional embodiments including foam, one or more pieces of foam material 50 may be placed in coalescing chamber 36 to assist in coalescing oil. In optional embodiments, the foam may be formed from polymers, plastics, metals, ceramics and combinations thereof.

In understanding how foam material 50 may be used in an optional embodiment of external adapter 10, air containing oil mist first may flow from a reservoir into airflow entrance 34 of external adapter 10. The air may then enter coalescing chamber 36 which may optionally allow the air to spread out and flow relatively evenly through coalescing media 38, which in this optional embodiment includes foam material 50. As such, the air flows through foam material 50. While the air passes through foam material 50, surface friction between the moving air and the internal surfaces foam material 50 may cause oil droplets to coalesce along the walls of foam material 50.

After adapter 10, and after traveling through foam 50, the air may continue into standpipe 44 of breather 28. As the air flows through standpipe 44, oil may optionally coalesce along the inner surface of the standpipe 44. The air with substantially reduced oil mist may then exit breather standpipe 44 and flow through particulate filters 46 and desiccant bed 48 and finally out through breather exit 49. The oil that is coalesced with foam material 50 and standpipe 44 may form droplets big enough to fall back into the reservoir under the influence of gravity. Otherwise stated, the coalesced oil may fall back into the reservoir under no external forces other than gravity, but as the reservoir inhales fresh air from the atmosphere, the incoming air may assist in purging the coalesced oil from external adapter 10 and breather 28.

In yet further optional embodiments, external adapter 10 may include external adapter labyrinth 52. Labyrinth 52 includes adapter standpipe 54 and adapter cap 56. Generally, in forming labyrinth 52, adapter standpipe 54 fits within adapter cap 56 and creates adapter cap space 58. Adapter cap 56 additionally may include one or more vent holes 60 for allowing airflow out of adapter cap space 58. In optional embodiments vent holes 60 may include as few as one hole as well as a significant plurality of holes. Optionally, vent holes 60 may be slotted, round, polygonal or take on a variety of shapes and patterns.

In practice air containing oil mist may flow from the reservoir into external adapter 10 through airflow entrance 34. The air then may enter coalescing chamber 36 where oil may begin to coalesce along adapter standpipe 54. After traveling through adapter standpipe 54, the air then collides with the inner surface of adapter cap 56 which may cause further oil to coalesce along the this surface of adapter 10. The air then may travel downward into adapter cap space 58 formed between adapter standpipe 54 and the inside of adapter cap 56. The distance can often be described as a short linear distance between these surfaces, and thus forces the majority of the air to flow along the surfaces, where surface friction may cause oil mist to coalesce. The air then may flow out through vent holes 60 on the side of adapter cap 56. This may cause remaining oil droplets to collide where they form larger droplets. These larger droplets then may collide within housing space 62 formed between adapter cap 56 and adapter housing 12, thus causing even further coalescing. The air flow within housing space may be described as upward or alternatively toward breather 28, while the oil may be coalescing as described.

After adapter 10, and after traveling through labyrinth 52, the air may continue into standpipe 44 of breather 28. As the air flows through standpipe 44, oil may optionally coalesce along the inner surface of the standpipe 44. The oil mist free air may then exit breather standpipe 44 and flow through particulate filters 46 and desiccant bed 48 and finally out through breather exit 50. Oil that is coalesced as it enters the adapter 10 and adapter standpipe 54 can drain back into the reservoir under the influence of gravity. The oil coalesced within adapter cap space 58, between adapter standpipe 56 and adapter cap 58; within housing space between adapter cap 58 and adapter housing 12 and along the walls of the breather standpipe 44 can drain back into the reservoir through drain port 64. The oil that is coalesced with external adapter 10 with labyrinth 52 and breather 28 may form droplets big enough to fall back into the reservoir under the influence of gravity. Otherwise stated, the coalesced oil may fall back into the reservoir under no external forces other than gravity, but as the reservoir inhales fresh air from the atmosphere, the incoming air may assist in purging the coalesced oil from external adapter 10 with labyrinth 52 and breather 28.

Figure 8:
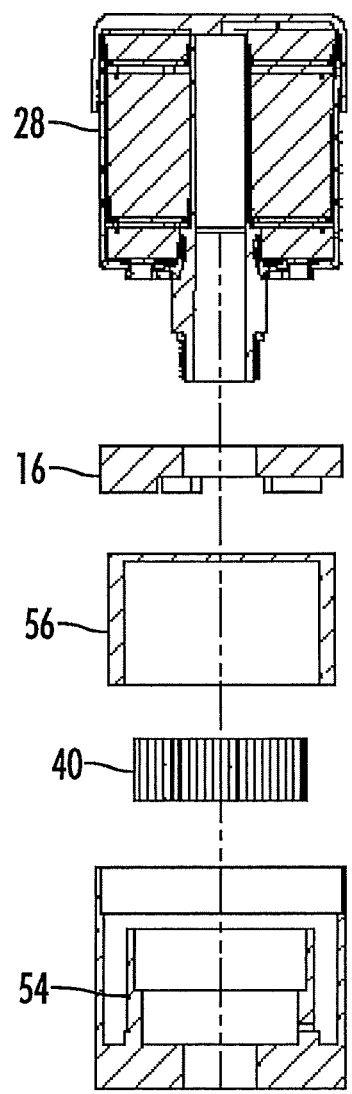
FIG. 8 is an illustration of an exploded view of an external oil coalescing adapter including honeycomb material and a labyrinth.
Figure 9:
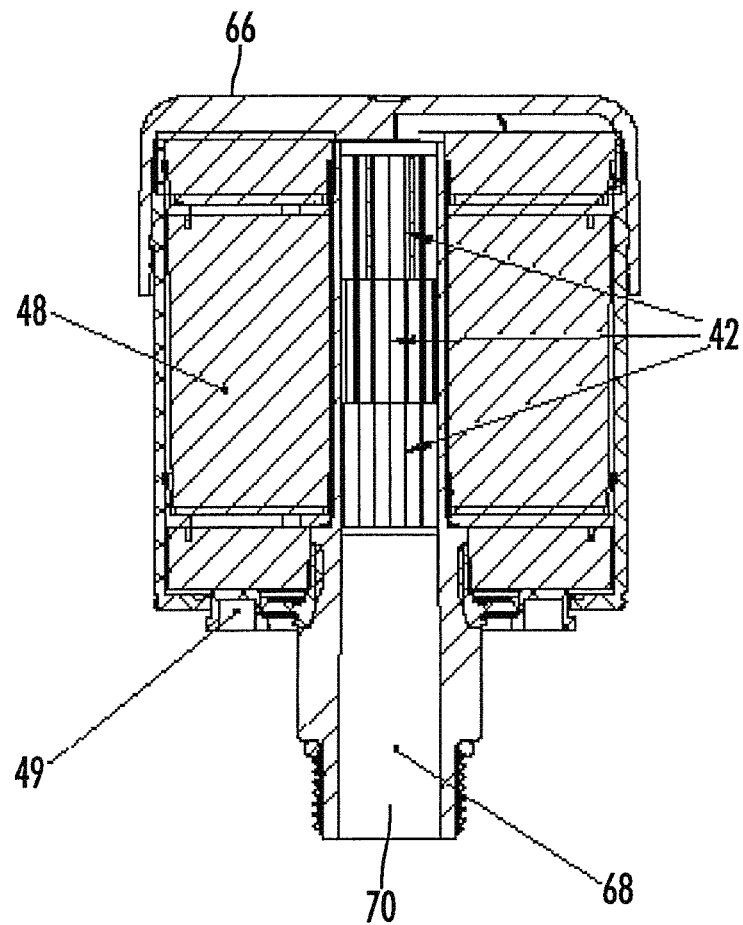
FIG. 9 is an illustration of an oil coalescing breather including honeycomb material.
Figure 10:
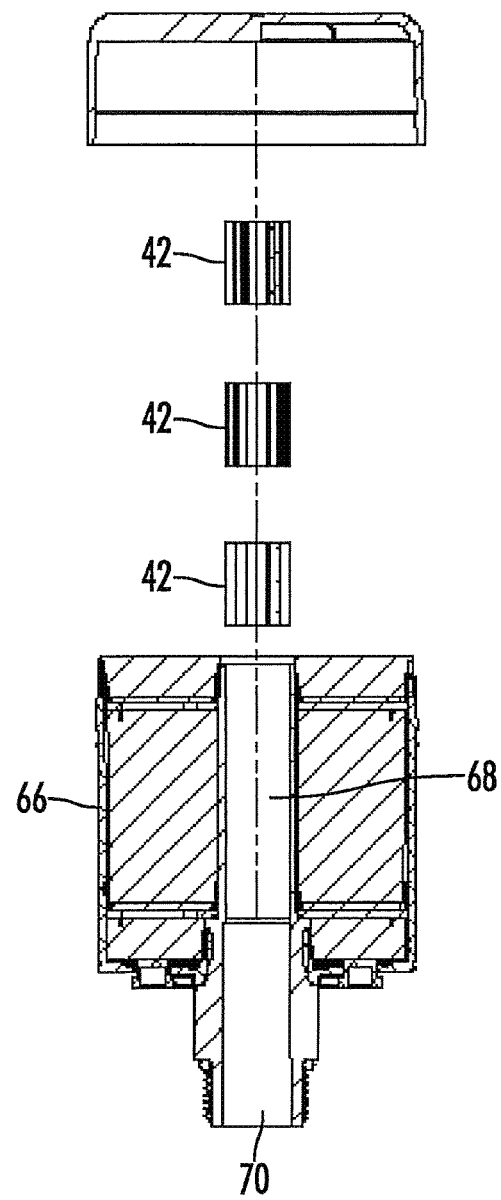
FIG. 10 is an illustration of an exploded view of an oil coalescing breather including honeycomb material.

In yet further optional embodiments, various features from the aforementioned external adapters can be combined and one should not consider the use of examples as limiting in any regard. For example, FIG. 8 provides an external adapter using both honeycomb and a labyrinth. Alternatively, the use of the foam, honeycomb and labyrinth can be combined in a variety of embodiments, for example even including the foam material with the labyrinth.

In yet further optional embodiments of the invention, FIGS. 9-16 illustrate oil coalescing breather 66 which may or may not be used with an external adapter 10. Generally, oil coalescing breather 66 can coalescing oil through the internal modifications done to such breather. As previously described various coalescing media 38 may be used with oil coalescing breather 66. The coalescing media 38 is typically understood to be positioned within standpipe 68 of oil coalescing breather 66.

In one such embodiment, honeycomb material 40 may be used within oil coalescing breather 66. The honeycomb material 40 may be positioned within standpipe 68. Optionally, as previously described, honeycomb material 40 may be in honeycomb layers 42 and may be offset.

Generally in practice with the honeycomb containing embodiment of the oil coalescing breather 66, the air flow is understood to contain oil mist which flows from the reservoir into the oil coalescing breather entrance 69 of oil coalescing breather 66. As the air travels up breather standpipe 68, oil can begin to coalesce along the inner surface of standpipe 68. The oil containing air can then flow through honeycomb layers 42, within standpipe 68. As the air passes through honeycomb layers 42, surface friction between the moving air and the internal surfaces of the honeycomb material 40 may cause oil droplets to coalesce along the walls of honeycomb material 40. Each layer of honeycomb may optionally be offset, forcing the air that didn't flow along a surface of the honeycomb material 40 to flow along the surface of the next layer of honeycomb. After traveling through honeycomb layers 42, the oil mist within the air is significantly reduced. The air with substantially reduced oil mist may then exit standpipe 68 and flow through particulate filters 46 and desiccant bed 48 and finally out through breather exit 49. The oil that is coalesced with honeycomb 40 and standpipe 68 may form droplets big enough to fall back into the reservoir under the influence of gravity. Otherwise stated, the coalesced oil may fall back into the reservoir under no external forces other than gravity, but as the reservoir inhales fresh air from the atmosphere, the incoming air may assist in purging the coalesced oil from oil coalescing breather 66.

In securing honeycomb material 40 within oil coalescing breather 66, lock rings may be used to affix the coalescing material. Alternatively, in optional embodiments, standpipe 68 may be tapered so as to further secure honeycomb material within oil coalescing breather 66.

Figure 11:
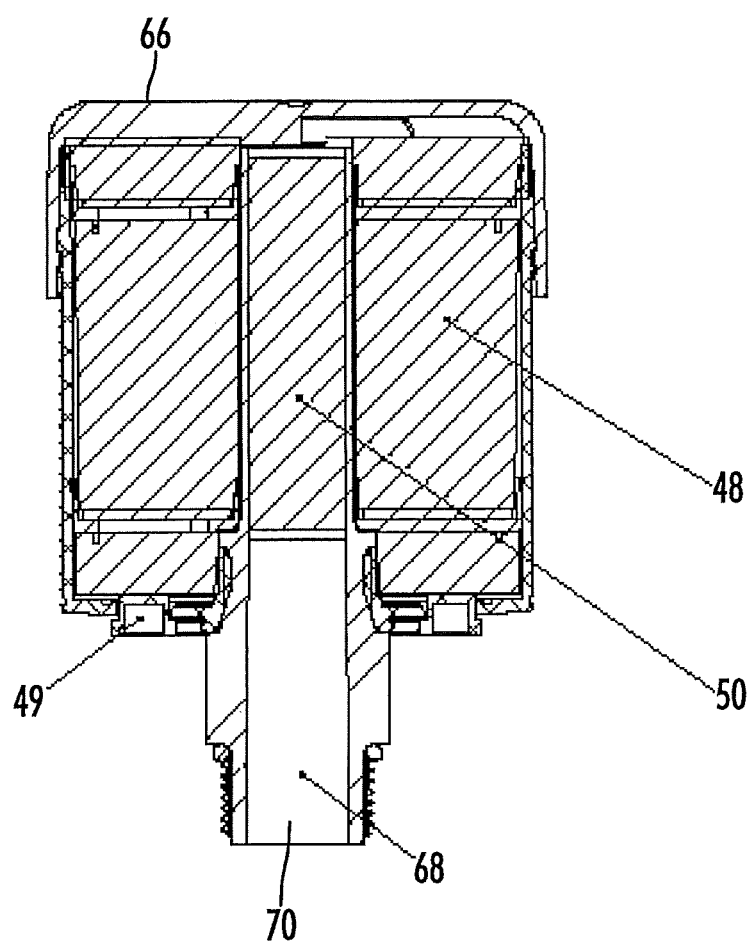
FIG. 11 is an illustration of an oil coalescing breather including foam material.
Figure 12:
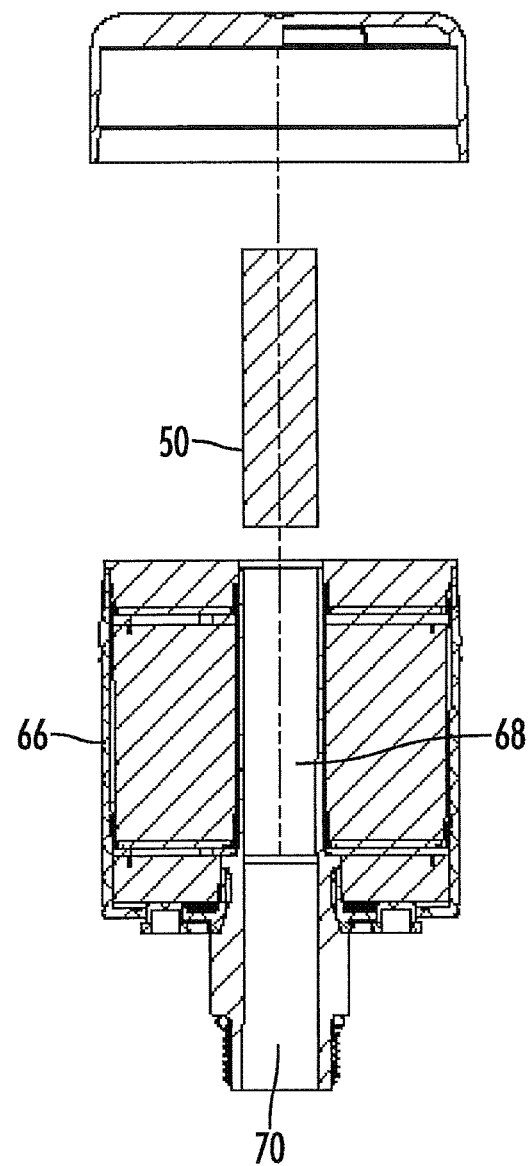
FIG. 12 is an illustration of an exploded view of an oil coalescing breather including foam material.
Figures 13A, 13B:
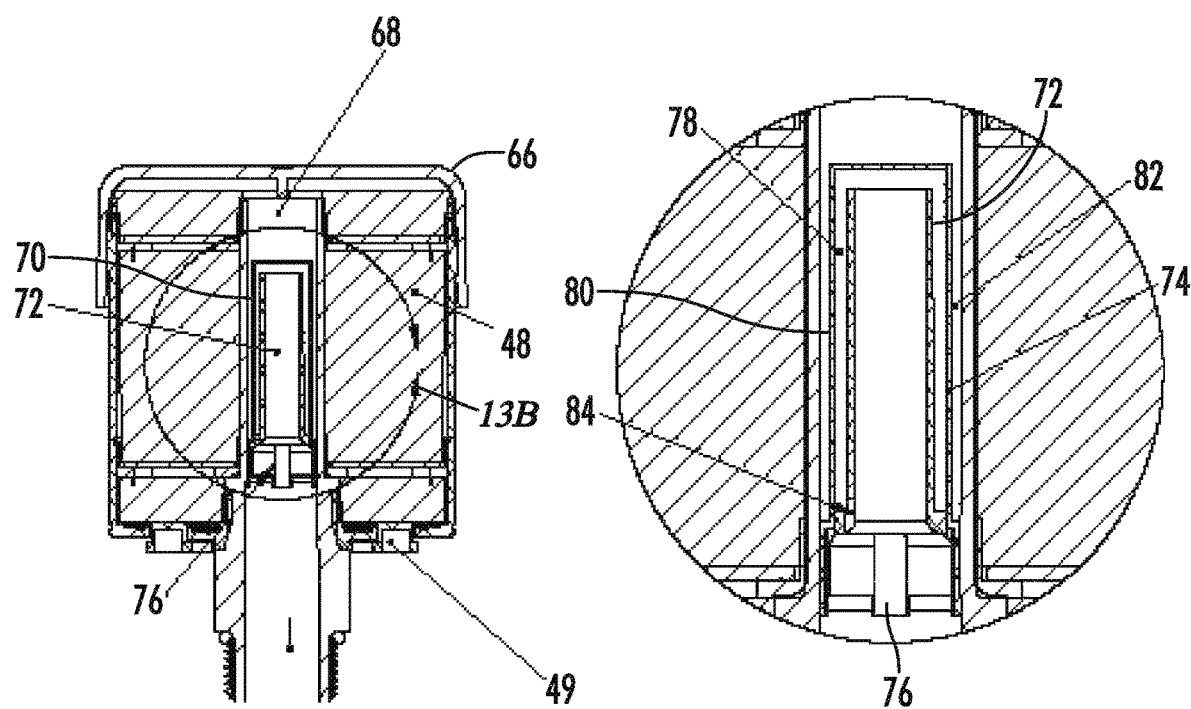
FIG. 13a-b is an illustration of an oil coalescing breather including a labyrinth.
Figure 14A:
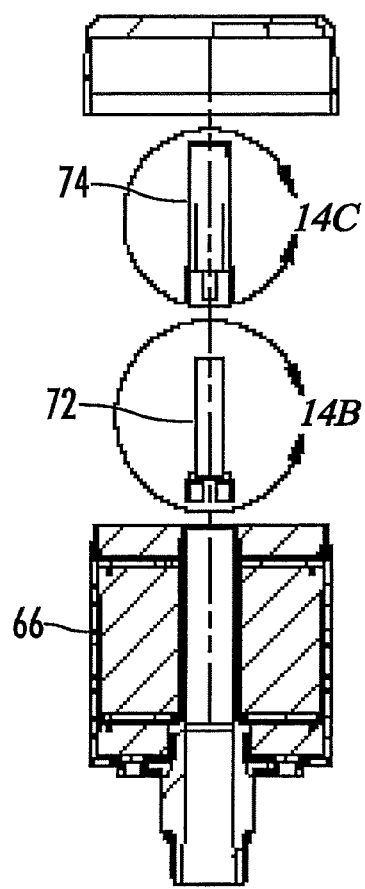
FIG. 14a-c is an illustration of an exploded view of an oil coalescing breather including a labyrinth with internal structures.
Figure 14B:
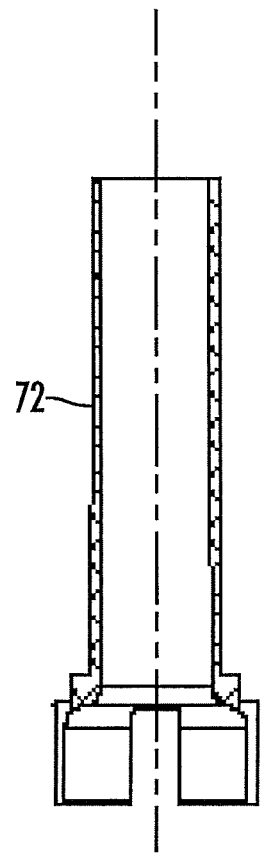
Figure 14C:
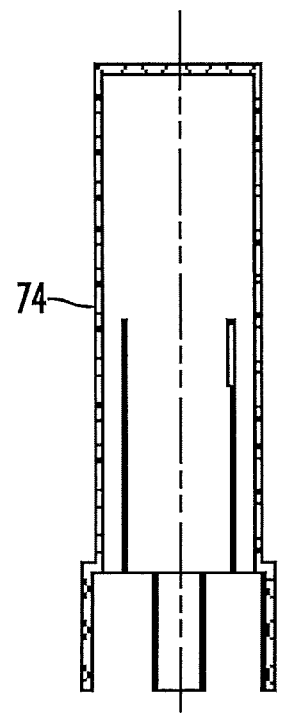
Figure 15A:
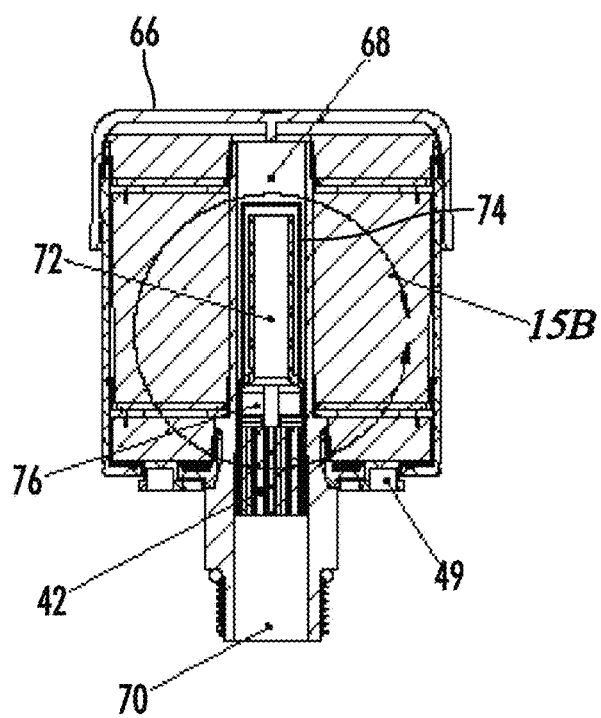
FIG. 15a-b is an illustration of an oil coalescing breather including honeycomb material and a labyrinth.
Figure 15B:
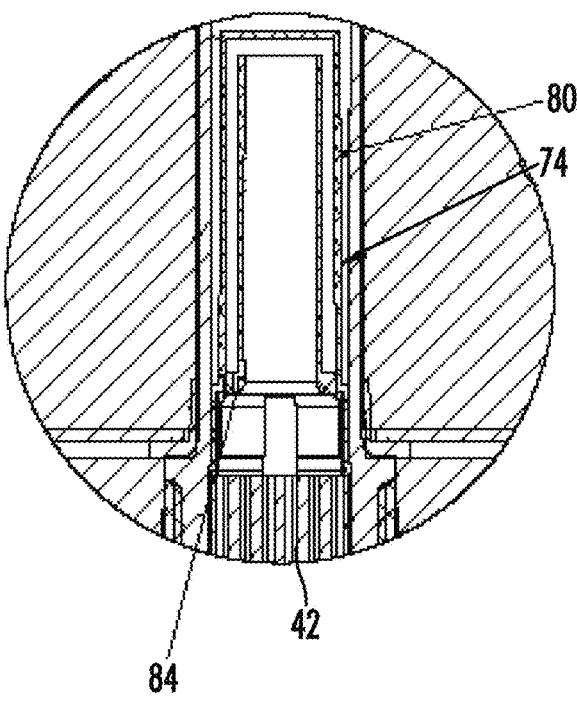
Figure 16:
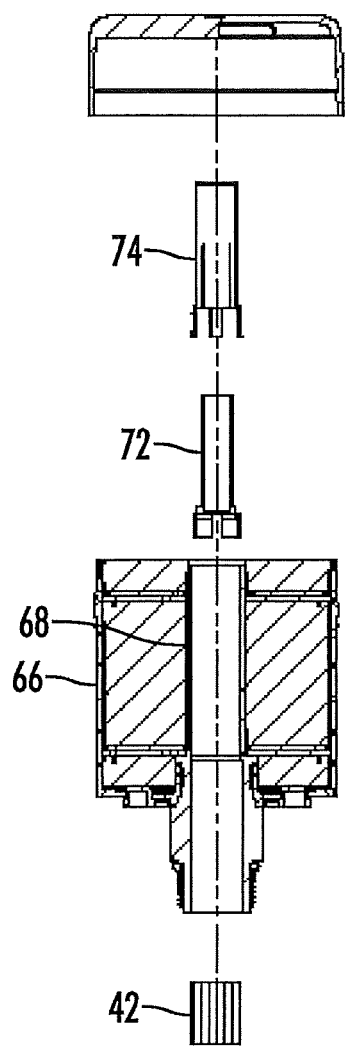
FIG. 16 is an illustration of an exploded view of an oil coalescing breather including honeycomb material and a labyrinth.

In yet further optional embodiments, foam material 50 may be used similarly to how honeycomb material 40 is used in embodiments of oil coalescing breather 66. FIGS. 11 and 12 provide illustrates of the use of foam, which can be used similarly to honeycomb and has also been described in reference to external adapters.

In yet further embodiments of oil coalescing breather 66, the breather may include labyrinth 70, including labyrinth standpipe 72 and labyrinth cap 74. In optional embodiments the two pieces of labyrinth 70, including labyrinth standpipe 72 and labyrinth cap 74 may be secured via a variety of different ways, including chemically fused or mechanically, to generally construct two permanently attached parts, though in some cases may be removable. The oil coalescing breather 66 may have standpipe 68 which is slightly tapered more toward the bottom, toward the breather entrance 69. The taper may preclude labyrinth 70 from falling out of standpipe 68.

In optional embodiments of the invention, labyrinth 70 may include reduced cross-sectional entrance 76 to increase the speed of the air flowing through labyrinth 70. As the area for the air flow is reduced due to the reduced cross-sectional entrance 76, the oil droplets may collide and combine to form bigger droplets that more readily coalesce. Generally oil mist is coalesced through a combination of flow along surfaces, where surface friction causes oil to coalesce, and collide where also the increase in air velocity may also increase the efficiency of the coalescing.

In practice, oil from airflow may begin to coalesce along the walls and bottom of labyrinth 70, and also may continue to coalesce along the inner surfaces of labyrinth standpipe 72. The air, which may optionally be moving faster due to reduced cross-sectional entrance 76, may collide with the inner surface of labyrinth cap 74, further causing coalescing. The air then may travel within labyrinth space 78 formed between labyrinth cap 74 and labyrinth standpipe 72. The air may then move within labyrinth vent holes 80 which may include as few as one hole as well as a significant plurality of holes. Optionally, vent holes 80 may be slotted, round, polygonal or take on a variety of shapes and patterns. The air may then flow within breather-cap space 82 where further oil may coalesce against the walls of each structure. The substantially oil mist free air may then exit breather standpipe 68 and optionally flow through particulate filters 46 and desiccant bed 48 and finally out through breather exit 50, if such structures are present and included with the design of breather 66. The oil coalesced in the bottom of breather standpipe 68, the labyrinth and entrance of the labyrinth standpipe 72; and the inside of the labyrinth standpipe 72 can drain back down into the reservoir under the influence of gravity. The oil that is coalesced above labyrinth 70 on the inner surface of the top of labyrinth cap 74; within labyrinth space 78; in the labyrinth vent holes 80; within breather cap space 82; and on the inside of breather standpipe 68 above labyrinth 70 can drain back down into the reservoir under the influence of gravity through the labyrinth drain 84. The draining of labyrinth 70 may be improved when the reservoir inhales fresh air through the breather which may force oil in the labyrinth to drain back into the reservoir.

In yet further optional embodiments, various features from the aforementioned oil coalescing breathers can be combined and one should not consider the use of examples as limiting in any regard. For example, honeycomb or foam may be use together or with the labyrinth within an oil coalescing breather. Alternatively, the use of the foam, honeycomb and labyrinth can be combined in a variety of embodiments.

Furthermore, sizes of various structural parts and materials used to make the above mentioned components are illustrative and exemplary only, and persons of ordinary skill in the art would recognize that these sizes and materials can be changed as necessary to produce different results or different desired characteristics.

It would become apparent to those skilled in the art that various modifications and variations can be made to the structure and methodology of the present invention. Thus, it should be understood that the invention is not limited to the examples discussed in the specification. Rather, the present invention is intended to cover modifications and variations.

What is claimed is:

1. An external oil coalescing adapter configured to fit to a desiccant breather, the adapter comprising:
    an adapter housing with a coalescing chamber for receiving an air flow containing oil;
    a first end for receiving the air flow containing oil into the coalescing chamber, the first end having a single flow passage configured to receive both air flow and coalesced oil via the air flow containing oil;
    a second end located at an opposite side of the external oil coalescing adapter from the first end, the second end parallel to the first end, the second end configured for emitting air from the coalescing chamber; and
    a honeycomb material having a plurality of openings for coalescing oil contained in the air flow and positioned between the first end and the second end configured such that coalesced oil accumulates towards the first end, wherein the plurality of openings are sufficiently large to allow coalesced oil to fall into the first end under a force provided by gravity, the first end configured to both provide the air flow containing oil into the coalescing chamber and to receive the coalesced oil.

2. The adapter of claim 1 wherein the honeycomb material comprises a plurality of layers with each layer including a plurality of openings with the openings of at least one layer offset from the openings of another layer.

3. The adapter of claim 1 further comprising:
    a first end cap, including a first ring, configured to fit at least partially inside the adapter housing at the first end and a second end cap, including a second ring, configured to fit at least partially inside the adapter housing at the second end;
    wherein the honeycomb material is held in place by the first ring and the second ring.

4. The adapter of claim 1 wherein the honeycomb material is formed from material chosen from plastics, polymers, metals, fibrous materials, ceramics, and combinations thereof.

5. The adapter of claim 1 wherein the openings of the honeycomb material are positioned to extend longitudinally from the first end to the second end.

6. The adapter of claim 3 wherein the adapter housing is substantially cylindrical in shape and includes an inner diameter defining the coalescing chamber; and wherein the honeycomb material is substantially cylindrical in shape and includes an outer diameter substantially equal to the inner diameter of the adapter housing.

7. The adapter of claim 6 wherein the adapter housing includes a threaded inner wall; and wherein the first end cap includes first end cap threads and second end cap includes second end cap threads; the first end cap threads and second end cap threads configured to attach to the threaded inner wall of the adapter housing.

8. The adapter of claim 3 further comprising pressure fits configured to join the first end cap and the second end cap to the adapter housing.

9. The adapter of claim 3 wherein the first end cap and second end cap are permanently affixed to the adapter housing.

10. An oil coalescing breather comprising:
a breather housing with a standpipe for receiving an air flow containing oil;
a first end for receiving the air flow containing oil into the standpipe, the first end having a single flow passage configured to receive both air flow and coalesced oil via the air flow containing oil;
a second end located at an opposite side of the standpipe from the first end, the second end parallel to the first end, the second end configured for emitting air from the standpipe; and
a honeycomb material for coalescing oil contained in the standpipe, the honeycomb material comprising a plurality of openings and positioned between the first end and the second end configured such that coalesced oil accumulates towards the first end, wherein the honeycomb material includes honeycomb layers, each layer of the honeycomb layers having a plurality of openings large enough to allow coalesced oil to fall into the first end under a force provided by gravity, the first end configured to both provide the air flow containing oil into the coalescing chamber and to receive the coalesced oil.

11. The breather of claim 10 wherein each layer comprises a plurality of openings offset from the openings of another layer.

12. The breather of claim 10 further comprising lock rings configured to hold the honeycomb material within the standpipe.

13. The breather of claim 10 wherein the honeycomb material is formed from material chosen from plastics, polymers, metals, fibrous materials, ceramics, and combinations thereof.

14. The breather of claim 10 wherein the standpipe is substantially cylindrical in shape and includes an inner diameter; and wherein the honeycomb material is substantially cylindrical and fit to the inner diameter of the standpipe.

15. The breather of claim 10 wherein each layer comprises a plurality of openings extending longitudinally from the first end to the second end.

16. The breather of claim 10 wherein each layer of the honeycomb layers are positioned in fluid series connection.

17. An oil coalescing breather comprising:
a breather housing with a standpipe for receiving an air flow containing oil;
a first end for receiving the air flow containing oil into the standpipe, the first end having a single flow passage configured to receive both air flow and coalesced oil via the air flow containing oil;
a second end located at an opposite side of the standpipe from the first end, the second end parallel to the first end, the second end configured for emitting air from the standpipe; and
a honeycomb material for coalescing oil contained in the standpipe, the honeycomb material comprising a plurality of openings and positioned between the first end and the second end such that coalesced oil may accumulate towards the first end, the honeycomb material comprising a plurality of layers of honeycomb material with each layer comprising a plurality of openings offset from the openings of another layer, each of the plurality of openings configured large enough to allow coalesced oil to fall into the first end under a force provided by gravity, the first end configured to both provide the air flow containing oil into the coalescing chamber and to receive the coalesced oil.

* * * * *